US012800369B2

(12) United States Patent
Sevar

(10) Patent No.: US 12,800,369 B2
(45) Date of Patent: Nov. 17, 2026

(54) NON-INVASIVE METHOD AND SYSTEM TO MEASURE THE SURFACE VELOCITY OF A FLUID FLOWING IN A RIVER, OPEN CHANNEL OR IN AN UNDERGROUND PIPE

(71) Applicant: FLOW-TRONIC S.A., Welkenraedt (BE)

(72) Inventor: Jean-Marie Sevar, Welkenraedt (BE)

(73) Assignee: FLOW-TRONIC S.A., Welkenraedt (BE)

(*) Notice: Subject to any disclaimer, the term of this patent is extended or adjusted under 35 U.S.C. 154(b) by 231 days.

(21) Appl. No.: 18/261,528

(22) PCT Filed: Jun. 20, 2022

(86) PCT No.: PCT/EP2022/066731
§ 371 (c)(1),
(2) Date: Jul. 14, 2023

(87) PCT Pub. No.: WO2022/268721
PCT Pub. Date: Dec. 29, 2022

(65) Prior Publication Data
US 2024/0310196 A1 Sep. 19, 2024

(30) Foreign Application Priority Data
Jun. 21, 2021 (EP) .................................... 21180592

(51) Int. Cl.
*G01F 1/663* (2022.01)
*G01P 13/04* (2006.01)

(52) U.S. Cl.
CPC ............ *G01F 1/663* (2013.01); *G01P 13/045* (2013.01)

(58) Field of Classification Search
CPC ............................... G01F 1/663; G01P 13/045
See application file for complete search history.

(56) References Cited

U.S. PATENT DOCUMENTS 5,315,868 A * 5/1994 Jacobi ....................... G01P 5/14 73/178 R
9,677,922 B2 * 6/2017 Skowaisa .............. G01F 23/284
2003/0056584 A1 * 3/2003 Park ........................ G01F 1/692 73/204.11

(Continued)

OTHER PUBLICATIONS

N. Rüssmeier, A. Hahn and O. Zielinski, "Ocean surface water currents by large-scale particle image velocimetry technique," Oceans 2017—Aberdeen, Aberdeen, UK, 2017, pp. 1-10, (Year: 2017).*

(Continued)

*Primary Examiner* — Marcus E Windrich
(74) *Attorney, Agent, or Firm* — Merchant & Gould P.C.

(57) ABSTRACT

A stationary system is for measuring the surface velocity of a fluid flowing in a river, an open channel or an underground pipe. The system includes a non-invasive device measuring the surface velocity of the fluid, and a wind speed and direction measuring device to validate and/or to correct the measurements taken by the non-invasive device in order to take into account the effect of the wind on the surface velocity of the fluid. A method for validates and/or corrects the measurements carried out by the non-invasive device as a function of the wind speed and direction.

11 Claims, 8 Drawing Sheets

(56) References Cited

U.S. PATENT DOCUMENTS

| | | | | |
|---|---|---|---|---|
| 2015/0122051 A1* | 5/2015 | Frey | G01F 1/3266 | 73/861.24 |
| 2015/0354402 A1* | 12/2015 | Ehsani | F01D 21/003 | 290/44 |
| 2017/0184430 A1* | 6/2017 | Welle | G01F 1/663 | |
| 2017/0350915 A1* | 12/2017 | Hoheisel | G01P 13/045 | |
| 2018/0003531 A1* | 1/2018 | Rick | G01F 15/075 | |
| 2021/0190562 A1* | 6/2021 | Rud | G01K 1/143 | |
| 2021/0239501 A1* | 8/2021 | Theissl | G01F 1/698 | |

OTHER PUBLICATIONS

Russmeier, Nick, et al., "Ocean surface water currents by large-scale particle image velocimetry technique", Oceans 2017—Aberdeen, IEEE, Jun. 19, 2017, pp. 1-10, XP033236710, DOI: 10.1109/OCEANSE.2017.8084843 abstract, figures 3, 8. II. Data and methods, D. Environmental conditions. III. LSPIV Analysis Procedures, d) Postprocessing, 10 pgs.
International Search Report and Written Opinion received for PCT Serial No. PCT/EP2022/066731 on Sep. 23, 2022, 12 pgs.

* cited by examiner

NON-INVASIVE METHOD AND SYSTEM TO MEASURE THE SURFACE VELOCITY OF A FLUID FLOWING IN A RIVER, OPEN CHANNEL OR IN AN UNDERGROUND PIPE

CROSS-REFERENCE TO RELATED APPLICATIONS

This application is a National Stage Application of PCT/EP2022/066731, filed Jun. 20, 2022, which claims benefit of patent application Ser. No. 21180592.4, filed Jun. 20, 2021 with the European Patent Office, and which applications are incorporated herein by reference. To the extent appropriate, a claim of priority is made to each of the above-disclosed applications.

FIELD OF THE INVENTION

The invention relates to a method and system to measure the fluid surface velocity over a river, open channel or underground pipe or channel, said surface velocity being converted in an average velocity in the cross-sectional area wherein the fluid flows and then in a flow rate.

More specifically, the present invention relates to a non-invasive method and stationary system to measure this fluid surface velocity.

BACKGROUND OF THE INVENTION

Non-invasive methods for measuring the flow velocity of a fluid in a river, open channel or sewer, i.e. methods wherein there is no contact between the probe and the fluid, are becoming more and more popular. Among the techniques used we can find acoustic methods, optical methods, laser methods and microwave methods, the last ones being the most popular.

Measurements sensing the fluid velocity of a river or channel have been used for very long time. A first method consists of a mechanical velocity sensor attached to a rod which is held by an operator. When the water level and/or water velocity is too high to safely make the measurement by an operator, this technique must be abandoned. In addition mechanical systems have moving parts which can easily be damaged by the debris carried by the fluid.

To overcome this weakness, velocity sensors without moving parts like electromagnetic and ultrasonic water velocity sensors have been developed. Like for the mechanical systems, when attached to a rod held by an operator, they cannot be used when the water level and/or water velocity is too high. As a consequence, velocity sensors without moving parts have been attached in the fluid from open channel, river or pipe. In this configuration, they usually measure a very local velocity and they can also be damaged or fouled by debris.

More recently stationary ADCP (Acoustic Doppler Current Profiler) have been used to measure the flow rate from rivers or open channels. ADPC's can measure the velocity at a distance from the sensor ranging from several meters to long distances, but those sensors can also be damaged or fouled by the debris carried by the fluid.

To overcome the problems described above, non-invasive devices have been used, mainly microwave radar devices but also acoustic, laser and optical measuring systems which are installed above the fluid from a bridge or attached in a manhole, for measuring the surface velocity.

Non-invasive methods have the drawbacks that they measure the velocity at the surface of the fluid, surface velocity that can be heavily influenced by wind under specific conditions, especially at low water velocities or during wing gusts. Wind can accelerate or decelerate the water surface velocity inducing high errors especially when the wind blows with the water (accelerate) or against the water (decelerate).

SUMMARY OF THE INVENTION

The present invention aims to provide an improved non-invasive method and system to measure the fluid surface velocity in an underground pipe, river or channel taking into account wind influence on the surface velocity measurement.

To this end, the system comprises the non-invasive fluid surface velocity measuring device and a wind speed and direction measuring device. This wind measuring device is used to validate the measurements performed by the non-invasive fluid surface velocity measuring device and/or to correct these measurements depending on wind speed and direction. Preferably, the wind measuring device is used first to validate the measurements performed by the non-invasive fluid surface velocity measuring device and then to correct these measurements depending on wind speed and direction.

DESCRIPTION OF THE INVENTION

The invention relates to a stationary non-invasive method and system for measuring the fluid surface velocity in a river, open channel or underground conduit, using a wind speed and direction measuring device associated to the non-invasive device measuring the fluid surface velocity.

Figure 1:
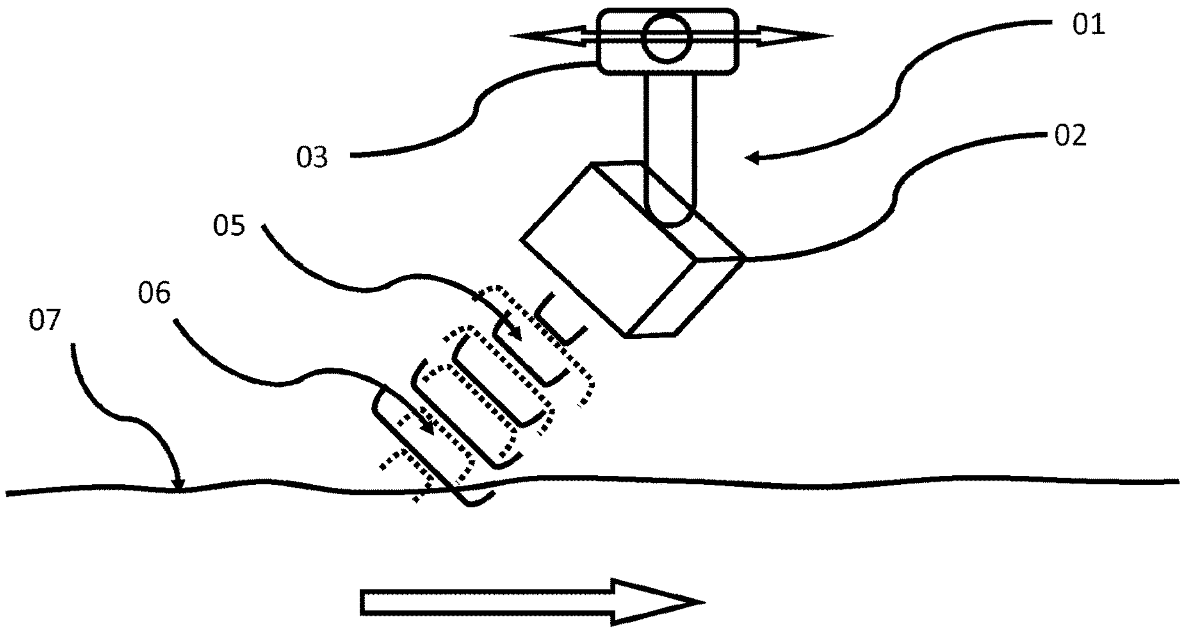
FIG. 01 represents schematically the stationary non-invasive fluid surface velocity measuring system 01, including a stationary non-invasive fluid surface velocity device 02 and a wind speed and direction device 03.

According to the invention, the non-invasive fluid surface velocity measuring system 01 schematically represented in FIG. 01 comprises a non-invasive fluid surface velocity device 02 and a wind speed and direction device 03. Said wind speed and direction device 03 is preferably a device measuring the wind along 2 or 3 axis. The wind speed and direction device is attached above, below or sideways from the non-invasive fluid surface velocity device 02. According to the invention, the measuring system 01 is stationary. It means that in use it is mounted at a fixed location above the fluid surface. This excludes measuring system including a moving part such as a drone.

The preferred non-invasive fluid surface velocity measurement device is a microwave radar device, but it could be any other non-invasive velocity measuring technology such as acoustic, laser or optical technology. The non-invasive fluid surface velocity measurement device 02 sends a microwave signal 05 towards the moving fluid surface 07, said moving fluid surface reflecting the microwave signal 06 with a Doppler shift proportional to the surface fluid velocity. Preferably, the microwave signal is generated by a patch antenna or horn antenna. The wind speed and direction measuring device 03 is associated to the non-invasive fluid surface velocity device 02 to measure the wind component that is blowing with or against the surface fluid.

The non-invasive fluid surface velocity measuring system can be powered with internal batteries, batteries that can be charged with a solar power device, a wind power device and/or any other suitable power device that can charge the batteries. The measuring system can also be powered externally using main power supply or external battery power supply connected or not to a main power supply, a solar power device, a wind power device and/or any other suitable power device that can charge the batteries.

Figure 2:
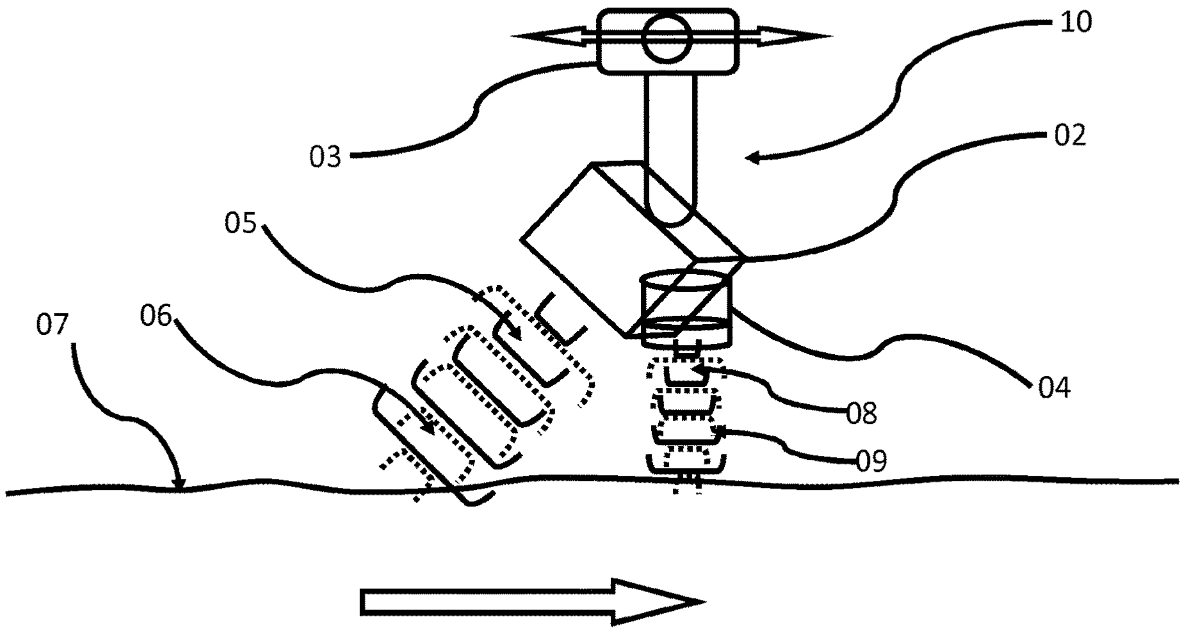
FIG. 02 represents schematically the stationary non-invasive fluid discharge measuring system 10, including the stationary non-invasive fluid surface velocity device 02, the wind speed and direction device 03 and a non-invasive level measuring device 04.

As shown in FIG. 02, a non-invasive level measuring device 04 can be part of the stationary non-invasive measuring system to become a non-invasive discharge measuring system 10 allowing to calculate the flow rate based on the continuity equation Q=V*A where Q is the flowrate, A is the cross-sectional wet area and V is the average velocity from the fluid flowing through the cross-sectional wet area, the shape and level measurement being used to calculate the cross-sectional wet area. The calculation of the average velocity V based on the measured fluid surface velocity is explained hereafter.

The non-invasive level measuring device 04 sends an ultrasonic or microwave signal 08 vertically towards the fluid surface 07, said fluid surface reflecting the ultrasonic or microwave signal 08 to the non-invasive level measuring device 04. The reflected signal is received with a time delay that is proportional to the distance between the non-invasive level measuring device 04 and the fluid surface 07, distance which is converted to the fluid level measurement. The non-invasive level measuring device can be integrated in the stationary non-invasive discharge measuring system or mounted separately at a more suitable location above the fluid surface.

Figure 7:
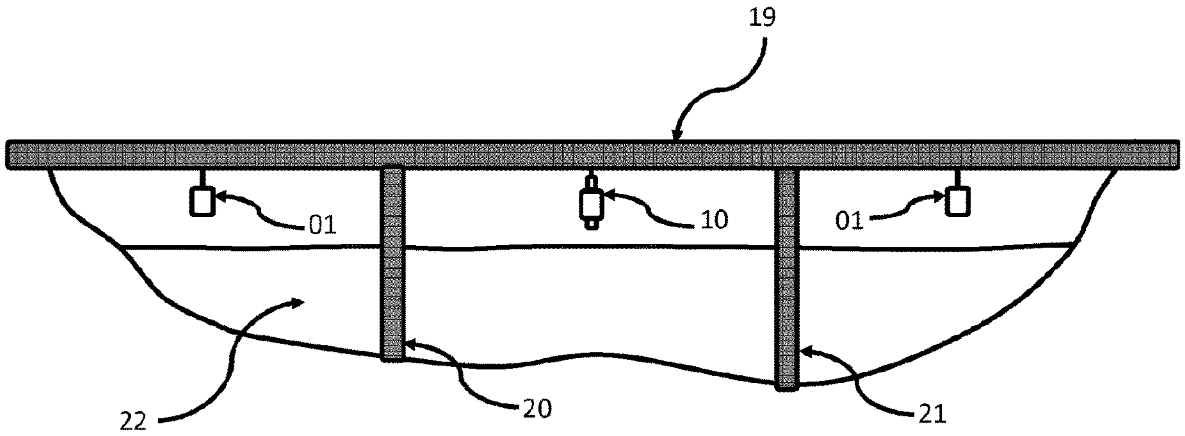
FIG. 07 represents a configuration where multiple stationary non-invasive fluid surface velocity measuring systems 01 are needed.

If the river or open channel is very large, several non-invasive velocity measuring systems might be required. The number of devices could be 2, 3, 4 to any number of systems depending on the application. As shown in FIG. 07, a bridge 19 having two pillars 20 and 21 is separating the cross-sectional wet area 22 in three parts. In such condition adding fluid surface velocity measuring systems 01 over the left and right part of the cross-sectional area might be required or might increase the accuracy. In such case each non-invasive fluid surface velocity measuring system can be equipped with a wind speed and direction measuring device. It is also possible to equip a reduced number of the non-invasive fluid surface velocity measuring systems located at strategic places to measure the wind speed and direction. If required, the wind speed and direction measuring devices could be mounted remotely from the non-invasive fluid surface velocity measuring devices. One or more non-invasive fluid surface velocity system can be equipped with the non-invasive fluid level measurement device to be a non-invasive fluid discharge measuring system 10.

Usually when multiple measuring devices are used, one device is designated as master and all other as slaves. The master interrogates the slaves and makes all calculations and computations to get the result which is usually the discharge or flow rate. Any device having the necessary communication channels and computation power can be designated as master, but the master could be an external device such as a data logger, SCADA device, computer or other. A remote server connected directly to the devices or through the cloud can be the master as well.

The invention also relates to a method to validate and/or to correct the fluid surface velocity measurements taken from a river, open channel or underground pipe or channel, allowing a precise flow rate Q calculation (Q=Avg.V*A). The fluid surface velocity (Surf.V) is modified to calculate the average velocity V (Avg.V) in the cross-sectional area A by using a multiplier a as follows:

$$\alpha = Avg.V / Surf.V$$

Figure 3A:
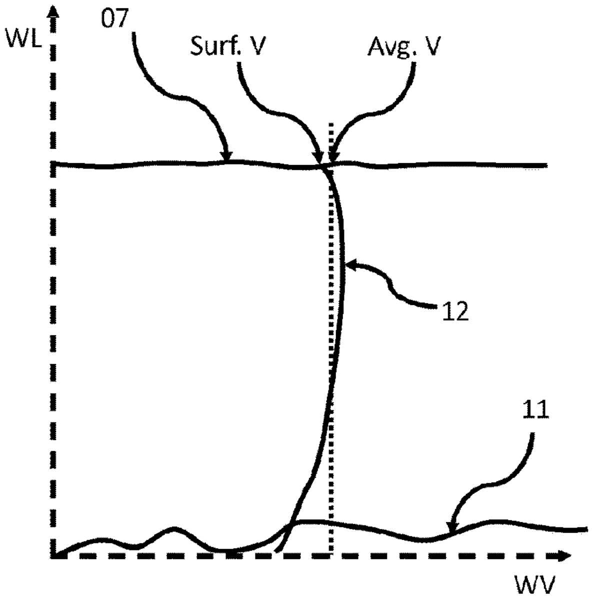
FIG. 03A shows a vertical velocity distribution curve 12 for a particular water level (WL) for a fluid flowing in an open channel or river over a smooth bottom bed 11 resulting in an average velocity (Avg. V) that is slightly higher than the measured surface velocity (Surf. V).
Figure 3B:
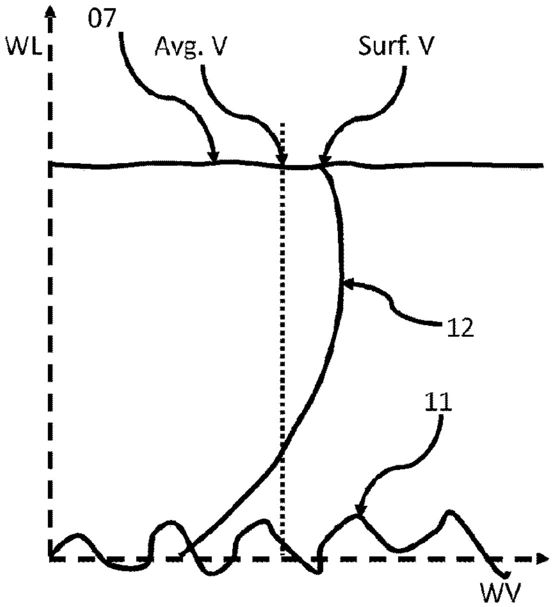
FIG. 03B shows a vertical velocity distribution curve 12 for a particular water level (WL) for a fluid flowing in an open channel or river over a rough bottom bed 11 resulting in an average velocity (Avg. V) that is lower than the measured surface velocity (Surf. V).
Figure 4:
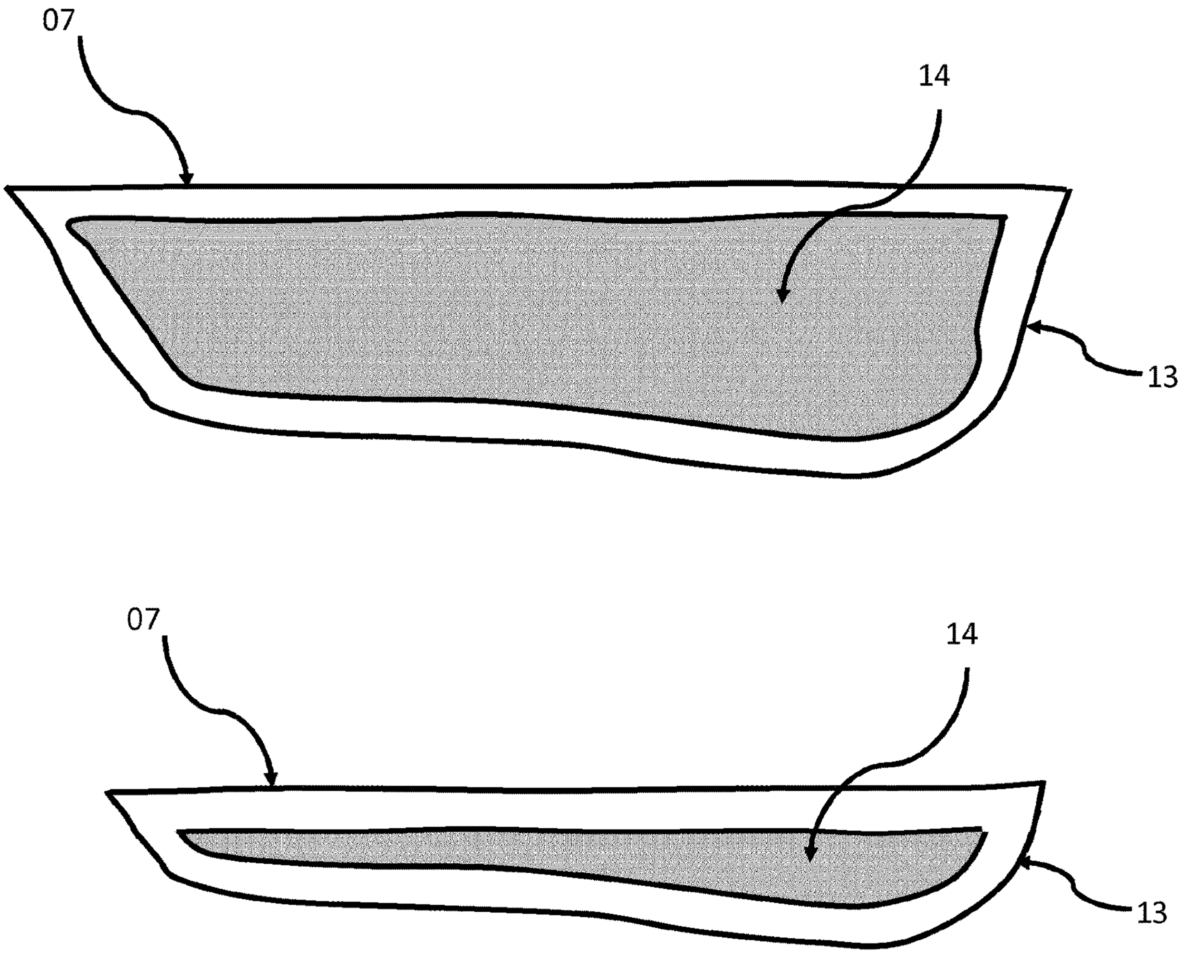
FIG. 04 shows the areas 14 at two different water levels that typically can be sensed by an ADCP to measure the velocity profiles.

One of the most critical issue for an accurate calculation of Q using a non-invasive fluid surface velocity measuring technology is the accurate determination of this a multiplier from the sensed surface velocity. FIG. 03A shows a vertical velocity distribution curve 12 for a particular water level (WL) for a fluid flowing in an open channel or river over a smooth bottom bed 11 resulting in an average velocity (Avg.V) that is slightly higher than the measured surface velocity (Surf.V). FIG. 03B shows the same vertical velocity distribution curve 12 for a particular water level (WL) for a fluid flowing in an open channel or river over a rough bottom bed 11 resulting in an average velocity (Avg.V) that is lower than the measured surface velocity (Surf.V). Usually the nature and roughness of a river bed, open channel bed or underground conduit can be considered as stable over time. If we do not consider the wind influence, the a multiplier can be accurately determined by making complete velocity profile measurements at different water levels. One of the best methods is to use an ADCP (Acoustic Doppler Current Profiler) placed on a small boat or floating device that is tethered by an operator from a bridge or use an UMB (UnManed Boat) that is conducted over the whole width of the river or channel representing the cross-sectional area. The ADCP can measure the velocity profile from +/−0.2 to 0.5 m distance from the surface to +/−0.2 to 0.5 m distance from the bottom (river bed). FIG. 04 shows the areas 14 that typically can be sensed by an ADCP to measure the velocity profiles. In FIG. 04 one can see the 2 areas sensed for 2 different water levels. This information can be computed to measure the average velocities in the cross-sectional area for each water level. The ADCP is also capable to measure the shape of the cross-sectional area (river bed) 13 so that the discharge can be calculated.

Figure 5:
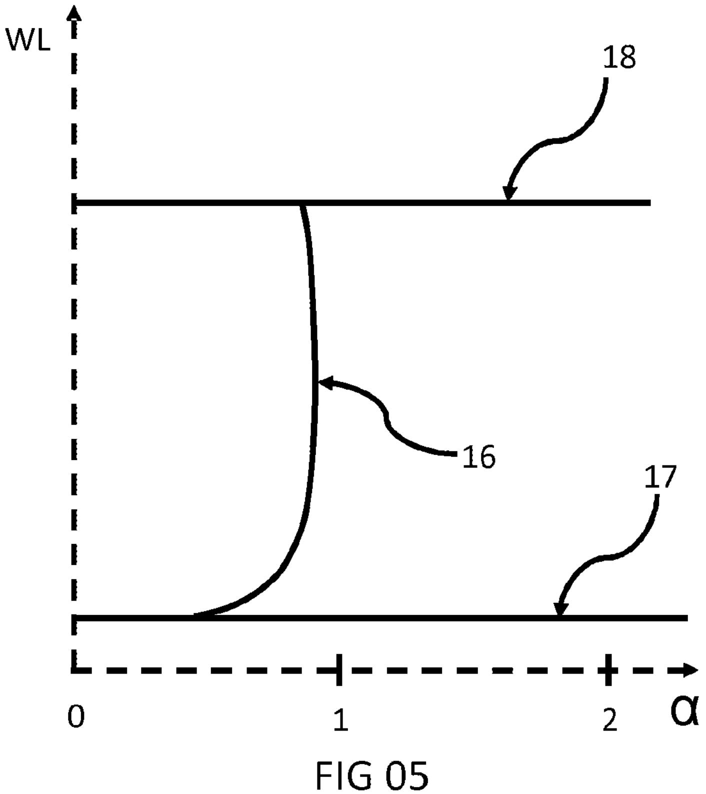
FIG. 05 shows the a multiplier factor curve 16 for a site, from the minimum water level 17 until the maximum water level 18, without taking wind effects into account.

Dividing the average velocity measured by the ADCP by the surface velocity measured by the non-invasive surface velocity measuring device gives the a multiplier for one particular water level, with no wind influence or zero wind velocity. This operation can be repeated for different water levels from small to high, so that a X Y graph (FIG. 05) can be plotted giving the a multiplier curve 16 with all values for all water levels (WL) with no wind influence from the minimum water level 17 to the maximum water level 18. So, these calibration tests with the ACDP allows to determine the a multiplier for each water level. Then, in practice, the average fluid velocity can be determined based on the fluid surface velocity measurements, the fluid level measurements and the a multiplier for this particular fluid level.

Figure 6A:
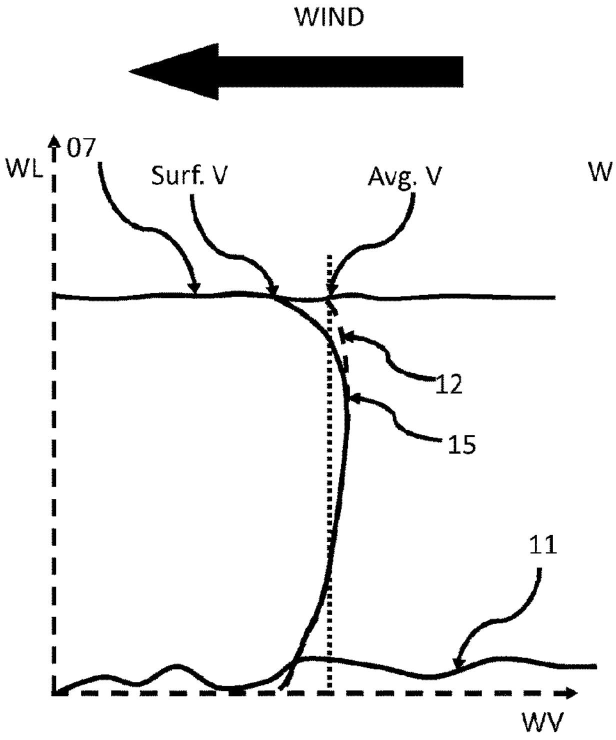
FIG. 06A shows a vertical velocity distribution curve 15 for a particular water level (WL) for a fluid flowing in an open channel or river resulting in a surface velocity (Surf. V) that is much lower than the surface velocity 12 measured without wind influence blowing against the surface water.
Figure 6B:
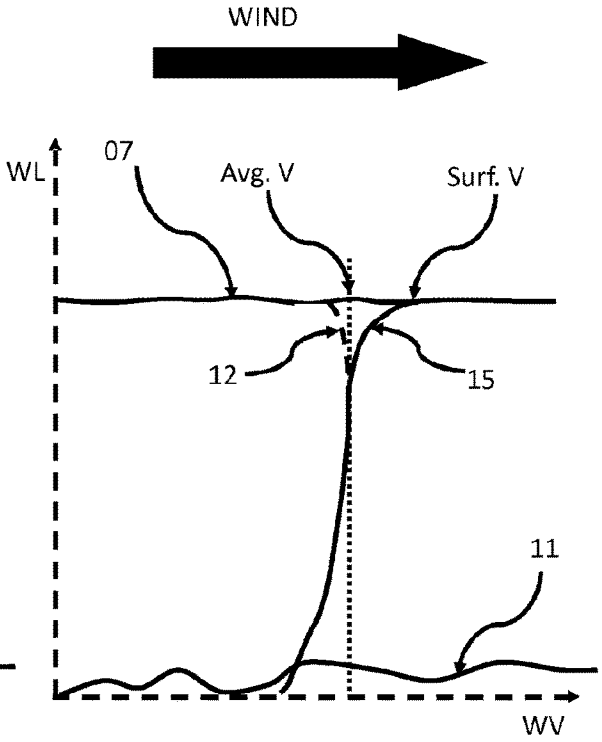
FIG. 06B shows a vertical velocity distribution curve 15 for a particular water level (WL) for a fluid flowing in an open channel or river resulting a surface velocity (Surf. V) that is much higher than the surface velocity 12 measured without wind influence blowing with the surface water.

Wind can accelerate or decelerate the water surface velocity inducing high errors especially when the wind blows with the water (accelerate) or against the water (decelerate). FIG. 06A shows a vertical velocity distribution curve 15 for a particular water level (WL) for a fluid flowing in an open channel or river resulting in a surface velocity (Surf.V) that is much lower than the surface velocity 12 measured without wind influence blowing against the surface water. FIG. 06B shows a vertical velocity distribution curve 15 for a particular water level (WL) for a fluid flowing in an open channel or river resulting a surface velocity (Surf.V) that is much higher than the surface velocity 12 measured without wind influence blowing with the surface water.

Figure 8:
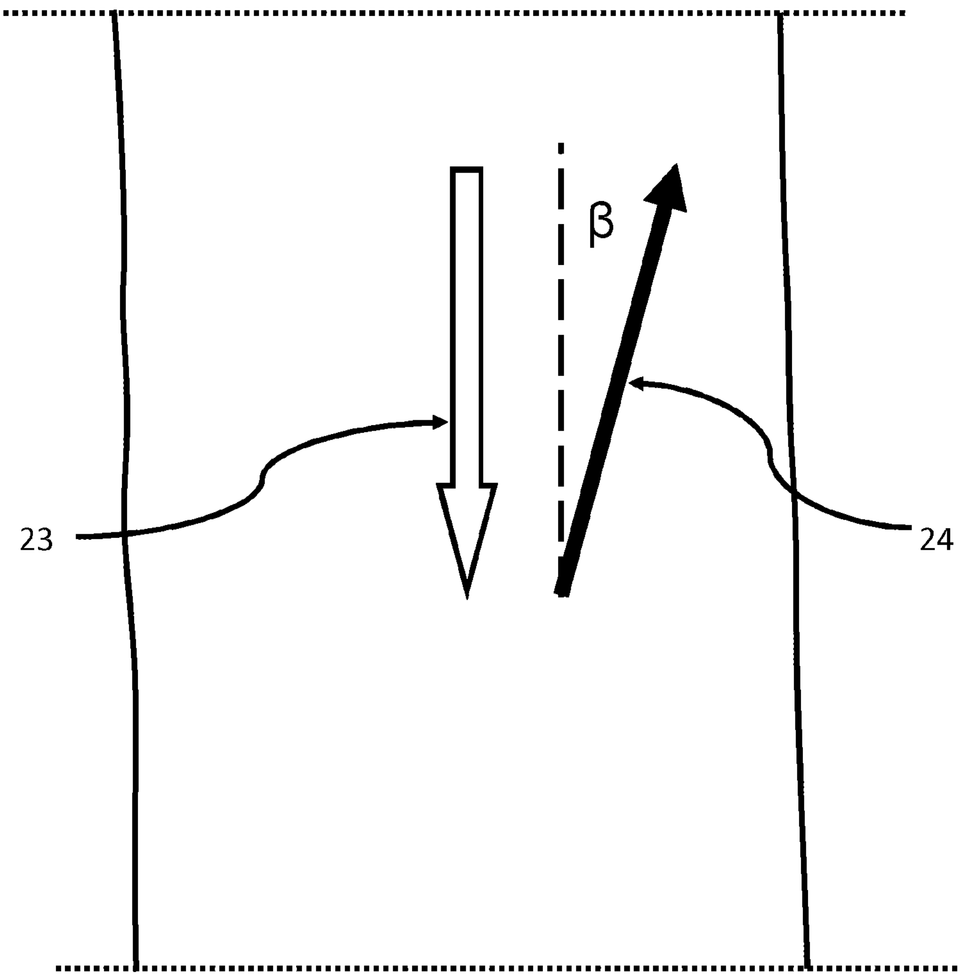
FIG. 08 represents schematically the correction that needs to be applied on the wind speed measurement when one horizontal axis of the sensor is not aligned with the fluid flow.

It is clear that without any corrections in the calculation of the average velocity large errors can be made. Wind has an increasing influence on the water surface when the fluid surface velocity decreases. Non-invasive fluid surface velocity devices had a measurement threshold of +/−0.2 to 0.3 m/s and therefore the wind influence was considered as negligible. Nowadays the sensitivity of the non-invasive fluid surface velocity devices has increased a lot so that fluid surface velocities of 0.1 to 0.15 m/s or even better can be achieved and the compensation and validation by wind speed and direction measurement is increasingly important. To this end, the fluid surface velocity measurement system according to the invention comprises the wind speed and direction measuring device. The wind direction is used to calculate the axial resultant or axial component of the wind speed which is parallel to the main water flow direction. In FIG. 08 one can see the axial surface velocity vector 23 and the velocity vector of the wind speed 24 blowing against the direction of the surface velocity with an angle β. In that particular case, the absolute wind speed value needs to be multiplied (reduced) by the cos value of the angle β. As an example, if the absolute wind speed value is 10 m/s and the angle β is 30°, cos 30=0.86603, the wind speed considered as blowing against the surface water will be 8.6603 m/s. If the wind speed and direction measuring device gives a 2 axis X & Y, the orientation of the wind speed and direction measuring device can be chosen so that one axis is parallel to main water flow direction and the second axis is perpendicular to that main water flow direction. This avoids the calculation of the axial resultant as the axis being parallel to the main water flow direction is the axial resultant of interest.

According to the method of the invention, the wind speed and direction measuring device is used to validate and/or to correct the fluid surface velocity measurements. Preferably, it is used to validate and to correct the fluid surface velocity measurements but the present application does not exclude to use it for only one of both actions and more specifically to validate the measurements.

Non-invasive fluid surface velocity measuring devices need a certain time varying from several seconds to several minutes to generate a fluid surface velocity measurement. It is important that the wind speed and direction measuring device measures during the same period of time than the non-invasive surface velocity measuring device, so that the wind correction and/or validation applies to the correct identical set of data.

The wind gust is used to validate or invalidate the fluid surface velocity measurements. Depending on the application, limits are set for wind gusts. A good example to qualify the wind effect as being a wind gust effect is to consider the duration which should typically represent 25% of the measuring time or less, with a minimum value of 2 seconds and with a velocity of the wind during that measuring time at least double the average wind speed during this measuring time. If the limits are exceeded, the fluid surface velocity measurement is flagged bad and the last good surface fluid velocity measurement is maintained.

The measurements can also be validated or invalidated based on the average wind speed during the measuring time. For example, if the axial component of the wind speed is superior to 5 times the fluid surface velocity during the measuring time, the measurements are invalidated. One technique may consist in using filtering to remove wind effects from fluid surface velocity measurements, mainly median filters that can totally ignore a fluid surface velocity measurement influenced by wind. The median filter compares last successive X fluid surface velocities (3, 5, 7, 9, . . . always an uneven number), sorts them from low to high or high to low and picks the middle value. If a measurement is heavily influenced by wind effect, it will never reach the middle value and will be eliminated.

However if the wind is strong enough over a longer period of time, the wind effect induced on the fluid surface velocity measurement will be longer than the medium filter period and the wrong surface water velocity will be taken into account and validated. For example, the wind can consistently blow with an average axial component speed 3 to 5 times higher than the fluid surface velocity. It is then better to correct the measurements.

To correct the fluid surface velocity based on the wind speed and direction measurements, an algorithm or mathematical model is used to compensate the fluid surface velocity measurements and drastically improve the accuracy. The algorithm or mathematical model can be theoretical, but the better approach is to calibrate them with measurements taken on site in the field with real conditions. Simulations of wind influences in laboratory are also easy to realize. An open channel is built having a steady running water flow which can be varied from low to high at different water levels. Measurements of the surface velocity can be taken at zero wind, and using a wind tunnel or variable speed blower, different steady wind speeds can be simulated flowing with the water or against the water. Accurate measurements of the surface water measurements under the different water levels and wind conditions can be taken. Those experiences can generate an accurate algorithm or mathematical model allowing the automatic compensation for wind effects on surface fluid velocity measurements.

An alternate simplified way of validating and/or correcting fluid surface velocities is to take wind measurements from nearby meteorological stations, determine the average wind speeds and directions and use them to correct or validate fluid surface measurements. This method however is much less accurate.

The invention claimed is:

1. A method for measuring a surface velocity of a fluid flowing in a river, an open channel or an underground pipe using a stationary system comprising:

a microwave radar device measuring the surface velocity of the fluid, a wind speed and direction measuring device to validate measurements taken by the microwave radar device in order to take into account effect of wind on the surface velocity of the fluid;

said method comprising:

measuring the wind speed and direction to validate the measurements carried out by the microwave radar device, wherein the wind direction is used to calculate an axial component of the wind speed which is parallel to the fluid flow direction, measuring the surface velocity of the fluid and fluid flow direction, comparing the axial component of the wind speed parallel to the fluid direction and the surface velocity of the fluid, invalidating the fluid surface velocity measurement when there is a wind gust, when the axial component of the wind speed parallel to the fluid flow direction is at least 5 times greater than the surface velocity of the fluid or when there is a change in the direction of the wind greater than 70°, during a measuring period, and flagging an invalidated fluid surface velocity measurement and maintaining a last valid fluid surface velocity measurement when the fluid surface velocity measurement is invalidated.

2. The method for measuring the surface velocity of a fluid flowing in a river, an open channel or an underground pipe according to claim 1, said method comprising measuring the wind speed and direction to validate and also to correct the measurements conducted by the microwave radar device.

3. A method for measuring a surface velocity of a fluid flowing in a river, an open channel or an underground pipe using a stationary system comprising:

a microwave radar device measuring the surface velocity of the fluid, a wind speed and direction measuring device to validate measurements taken by the microwave radar device in order to take into account effect of wind on the surface velocity of the fluid;

said method comprising measuring the wind speed and direction to validate the measurements carried out by the microwave radar device, wherein the wind direction is used to calculate an axial component of the wind speed which is parallel to the fluid flow direction, and wherein the fluid surface velocity measurement is invalidated when there is a wind gust, when the axial component of the wind speed parallel to the fluid flow direction is at least 5 times greater than the surface velocity of the fluid or when there is a change in the direction of the wind greater than 70°, during a measuring period, wherein median filters are used to invalidate the fluid surface velocity measurement when during the measuring period the axial component of the wind speed parallel to the fluid flow direction is at least 5 times greater than the surface velocity of the fluid, said median filters comparing the X last successive fluid surface velocity measurements, X being an uneven number, and sorting the fluid surface velocity measurements from low to high or high to low and picking a middle value, the fluid surface velocity measurement influenced by the wind being de facto not the middle value and thus invalidated.

4. The method according to claim 1, wherein the fluid surface velocity is corrected based on an algorithm or mathematical model, said algorithm or mathematical model being theoretical or empirical.

5. The method according to claim 4, wherein the algorithm or mathematical model is empirical and based on measurements taken on site with real conditions or in laboratory.

6. The method according to claim 1, wherein the wind speed and direction measuring device is a device measuring the direction of the wind along 2 axes.

7. The method according to claim 1, wherein the wind speed and direction measuring device is a device measuring the direction of the wind along 3 axes.

8. The method according to claim 1, wherein the microwave radar device is a patch antenna or horn antenna generating microwave signals that are transmitted towards the fluid surface, said fluid surface reflecting microwave signals with a Doppler frequency shift that is captured by the patch antenna or horn antenna.

9. The method according to claim 1, wherein said stationary system is free of drones.

10. The method according to claim 1, wherein the wind speed and direction measuring device is attached above, below, or laterally from the microwave radar device.

11. The method according to claim 1, wherein the wind speed and direction measuring device is mounted remotely from the microwave radar device.

* * * * *